C. G. BURKHARDT.
Adjustable Bearing.
No. 223,029. Patented Dec. 30, 1879.
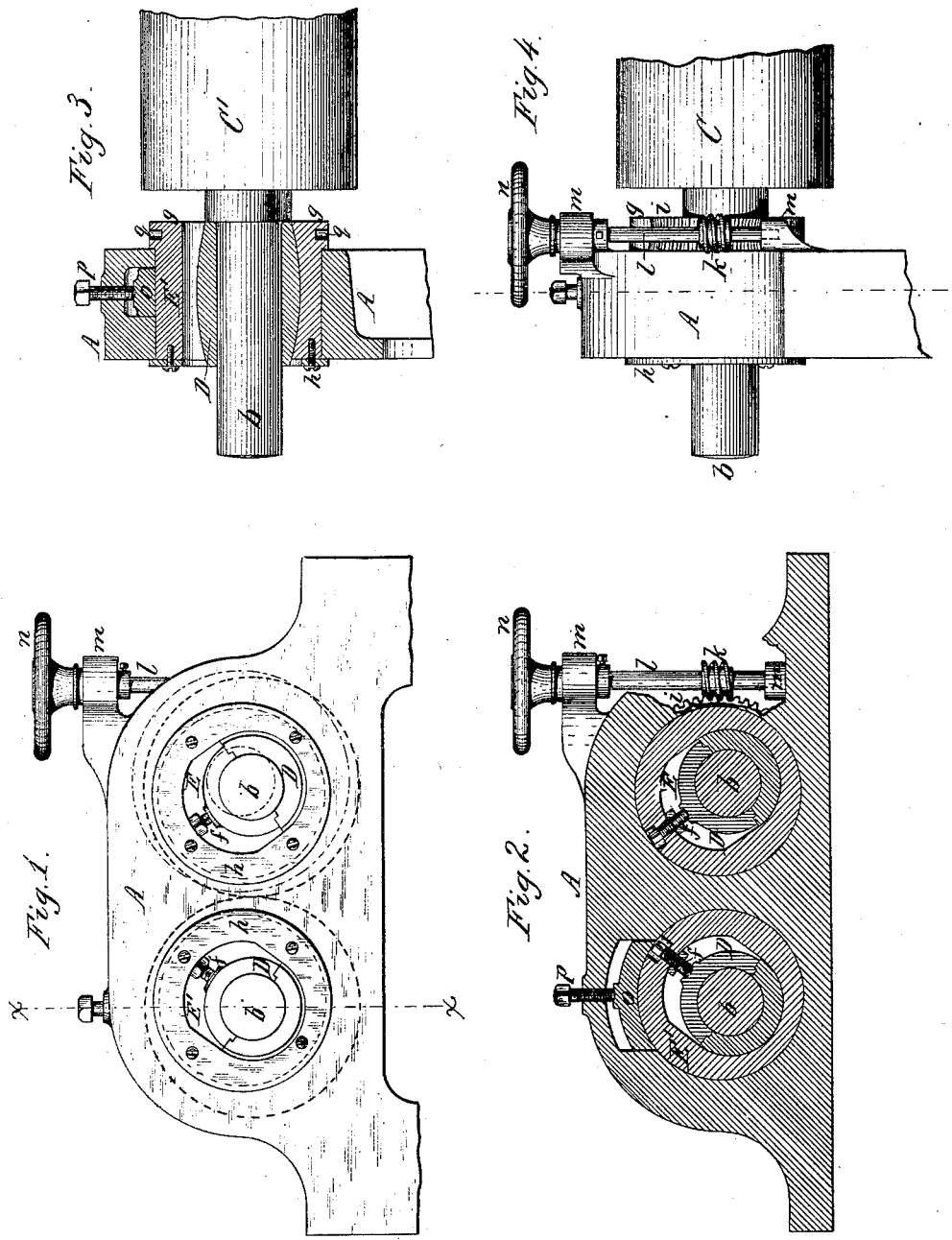

UNITED STATES PATENT OFFICE.

CHARLES G. BURKHARDT, OF BUFFALO, NEW YORK.

IMPROVEMENT IN ADJUSTABLE BEARINGS.

Specification forming part of Letters Patent No. 223,029, dated December 30, 1879; application filed November 20, 1879.

*To all whom it may concern:*

Be it known that I, CHARLES G. BURKHARDT, of the city of Buffalo, in the county of Erie and State of New York, have invented new and useful Improvements in Adjustable Bearings, of which the following is a specification, reference being had to the accompanying drawings.

This invention relates to the construction of an adjustable bearing, whereby the position of the shaft which is supported therein can be readily and nicely adjusted. The invention is more especially designed for the adjustment of the bearings of crushing and other rolls; but it may be advantageously applied for the adjustment of various other kinds of bearings.

My invention consists, principally, of a bearing arranged eccentrically within a ring or annular frame, which is movable in a circular seat of the stationary frame, so that by turning the ring in its seat the bearing secured eccentrically within the ring will be adjusted with reference to the stationary parts of the mechanism.

My invention also consists of various details of construction, as will be hereinafter fully set forth.

In the accompanying drawings, Figure 1 is a side elevation of the frame of a pair of rolls provided with my improved bearings. Fig. 2 is a longitudinal section thereof. Fig. 3 is a cross-section in line $x\,x$, Fig. 1. Fig. 4 is an end view of the device.

Like letters of reference designate like parts in the several figures.

A represents the stationary frame of the machine, and $b\,b$ the shafts of a pair of rolls supported therein, C representing the movable roll, and C′ the stationary roll.

D represents the bearings in which the shafts $b\,b$ turn. E is a ring or open annular frame surrounding each bearing D, and arranged in a circular seat in the stationary frame A. Each bearing D is firmly secured within the ring E by a set-screw, $f$, which works in a threaded opening of the ring and bears against the cap or removable part of each bearing, while the lower stationary part of each bearing is firmly embedded in the ring E, which latter is so shaped as to securely hold the stationary portion of the bearing.

The ring E is provided with a cavity or opening surrounding the head of the set-screw $f$, so as to permit access thereto for turning it by means of a suitable wrench.

The bearing D is arranged in each ring E eccentrically, so that the center of the shaft $b$ lies outside of the center of the ring E, in which the bearing of the shaft is secured. Upon turning the ring E in its circular seat in the stationary frame A, the shaft $b$ moves in a circle concentric with the ring E, thereby changing its position with reference to the stationary roller and approaching it or receding from it, according to the direction in which the ring E is turned. The latter is preferably formed on the inner side of the frame A with a projecting collar, $g$, which prevents the outward movement of the ring E, and on the outer side of the frame with an overlapping annular plate, $h$, which is secured to the end of the ring E by screws, and which prevents the inward movement of the ring.

The collar $g$ of the ring E of the movable roll is provided with a gear-segment, $i$, which meshes with a worm-wheel, $k$, mounted on a spindle, $l$. The latter turns in bearings $m$, secured to or formed with the side frame, A, and is provided at its upper end with a hand-wheel, $n$. By turning the worm-wheel $k$ in either direction the ring E is turned in its seat and the roll C is adjusted toward or from the roll C′, according to the direction in which the wheel $k$ is turned.

The pressure which is applied to the rolls or other machinery which is mounted on the shafts $b\,b$ is received by the rings E, and distributed upon the large bearing-surface afforded by the circular seats of these rings, while the adjusting mechanism is entirely relieved from all strains.

It is obvious that by my improved construction a very nice adjustment can be given to the rolls or other mechanism mounted on the shafts $b\,b$, and that said shafts are firmly supported and held in all positions.

As shown in the drawings, the bearing of the stationary roll C′ is also secured eccentrically in an adjustable ring, E′, which latter is held in position in its seat by a curved follower, O, and a set-screw, $p$, bearing upon the latter. The collar $g$ of the ring E′ is provided with holes or recesses $q$ for the insertion of a wrench, by means of which it can be turned in its seat. The adjustability of this roller is required only when a considerable movement is to be effected—for instance, when the extent of adjustability of the movable roller is insufficient for the desired adjustment. After changing the position of the stationary roller, the bearing of the latter is fixed in its new position by the set-screw $p$, and the finer adjustments are effected by the adjusting-gear of the movable roller C, as hereinbefore described.

The bearings and their seats in the rings E are preferably made convex or spheroidal in form, as shown, to enable the bearings to better adapt themselves to the position of the shafts $b$.

I claim as my invention—

1. An adjustable shaft-supporter composed of a movable ring or annular frame, E, and a bearing, D, secured eccentrically therein, substantially as set forth.

2. The combination, with the stationary roll C' and movable roll C, of the stationary side frame, A, ring E, and bearing D, secured eccentrically therein, substantially as set forth.

3. The combination, with the ring E and bearing D, secured eccentrically therein, of the gear-segment $i$ and actuating-wheel $k$, substantially as set forth.

4. The combination, with the ring E, of the spheroidal bearing D, secured eccentrically therein, substantially as set forth.

5. The combination, with the movable roll C and ring E, provided with adjusting mechanism $i$ $k$, of the stationary roll C', ring E', follower O, and set-screw $p$, substantially as set forth.

CHARLES G. BURKHARDT.

Witnesses:
 JNO. J. BONNER,
 EDW. J. BRADY.